United States Patent
Poddig et al.

[15] 3,652,989

[45] Mar. 28, 1972

[54] SENSING ARRANGEMENT FOR USE WITH APPARATUS FOR AUTOMATIC CHARACTER RECOGNITION

[72] Inventors: Dieter Poddig, Hamburg; Hans Hoffmann, Friedrichsgabe Post Harksheide, both of Germany

[73] Assignee: U.S. Philips Corporation, New York, N.Y.

[22] Filed: Nov. 13, 1968

[21] Appl. No.: 775,392

[52] U.S. Cl. ....................340/146.3 H

[51] Int. Cl. ....................G06k 9/12

[58] Field of Search ....................340/146.3

[56] References Cited

UNITED STATES PATENTS 3,273,123 9/1966 Lowitz ....................340/146.3

3,278,900 10/1966 Wood ....................340/146.3

3,305,835 2/1967 Beltz ....................340/146.3

3,346,845 10/1967 Fomenko ....................340/146.3

3,526,876 9/1970 Baumgartner et al. ....................340/146.3 J

*Primary Examiner*—Maynard R. Wilbur

*Assistant Examiner*—Leo H. Boudreau

*Attorney*—Frank R. Trifari

[57] ABSTRACT

A character recognition device for use with printed characters and designed to indicate the character at a plurality of interrogation positions. A storage device is included which will store information relating to a plurality of position digitized signals of a single vertical line element. The information of the vertical line element is modified within the storage device so as to provide an indication of the center of the vertical line element in accordance with one of the interrogation positions.

3 Claims, 5 Drawing Figures

INVENTORS
DIETER PODDIG
HANS HOFFMANN
BY
[signature]
AGENT

INVENTORS
DIETER PODDIG
HANS HOFFMANN
BY
[signature]
AGENT

INVENTORS
DIETER PODDIG, HANS HOFFMAN
BY
AGENT

SENSING ARRANGEMENT FOR USE WITH APPARATUS FOR AUTOMATIC CHARACTER RECOGNITION

This invention relates to a sensing arrangement for use with apparatus for the automatic recognition of printed characters of a given predetermined style of type which consist predominantly of vertical and horizontal line elements. The interrogation of the sensing is effected accurately at the characteristic points of the characters, namely the centers of the vertical lines, and a character store is available which can store the whole character in a matrix. The characters are sensed, for example, by means of the reflection measured by a photoelectric device which delivers, the binary black or white information of the character which information is stored in the character store in binary form.

The interrogation points may be determined from the center of the first-sensed vertical line of a character. However, this centre is known only when the line is ended so that at least particular storing possibilities for this first line must be available. Thus it has hitherto been common practice to use for reading, instead of the centre, a point at a fixed distance from the beginning of the first vertical line so that all the other interrogation points also show a certain shift relative to the ideal points. However, this is unfavorable especially for characters which are very thick, printed unsharply or slightly inclined.

A solution to this problem has been described in the prior U.S. Pat. application, Ser. No. 688,088, filed Dec. 5, 1967, and assigned to the assignee of the present invention, and consists in that use is made of a counter which successively passes through all positions again and again and whose counting rhythm has a frequency such that from one interrogation point to the next the counter rotates exactly once and which counter at the beginning of the first vertical line of a character receives a counting frequency of exactly half the said frequency and after the end of this line to the end of the character receives a counting pulse signal of the full frequency, each passage of the counter through the initial position being used as the second and further interrogation pulses. However, this solution is suitable only for determining the second and further interrogation points and does not permit of finding the first interrogation point. An object of the present invention is to provide possibilities for accurately obtaining also the information of the first interrogation point.

This is very advantageous, for example, for characters the edges of which are printed very irregularly or for characters which are somewhat inclined. The first interrogation point lies, according to determination, on the centre of the first vertical line of a character. However, this centre is known only when the whole line has been sensed and the end of the line reached. At this instant the center of the line is already past and the information at this point can thus not be obtained directly from the sensing. Consequently the information of the line must be stored intermediately to obtain therefrom subsequently the information of the centre of the line.

The arrangement according to the present invention is characterized in that the character store is, in addition, designed to store intermediately the information of at least the region of the first vertical line of a character which includes the centre by using additional interrogation points of more rapid succession at least during this line region.

In order that the invention may be readily carried into effect it will now be described in detail, by way of example, with reference to the accompanying diagrammatic drawings, in which:

FIG. 1 shows the positions of two first main interrogation points $T_1$ and $T_2$ and of the additional interrogation points $t_1$ to $t_n$ of a character. "V" and "H" indicate the front edge and the rear edge, respectively, of the first vertical line, the arrow indicating the direction of sensing.

Since $T_1$ lies at the center of the first vertical line, the distance between "V" and "H" is exactly double the distance between $T_1$ and "H." Use is made of a counter having a counting frequency and capacity such that the counter exactly completes one revolution between two interrogation points. This counting rhythm is therefore advantageously produced by a generator the frequency of which is controlled by the rate of reading. When this counter is started at "V" with a counting rhythm of half the above-mentioned frequency and the counting rhythm is switched from "H" on to the full frequency, then the counter operates as if it had started at $T_1$ directly at the full frequency since the double path of the half frequency from "V" to "H" is exactly balanced. So the counter completes its first revolution exactly at $T_2$ and this independent of the thickness of the line, since due to the switching of the frequency the counter always operates as if it would have started at $T_1$ at the full counting frequency.

Figure 1:
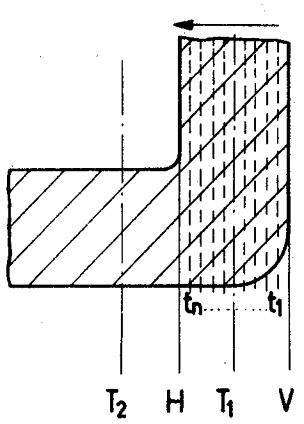
FIG. 1 shows the right-hand lower edge of a character.

According to the invention, in order to find the first interrogation point of the character, the character store is used as an intermediate store for the information of at least the region of the first vertical line of a character. The character store is empty at the beginning of a character or its information then still available is no longer needed. In a similar manner as this character store subsequently registers the whole character, first of all the beginning vertical line can be stored in that from the beginning of this line the sensing frequency is chosen to be much higher so that additional sensing points $t_1.....t_n$ lie very close together, as shown in FIG. 1. The counting rhythm of the aforementioned counter preferably lends itself to this higher sensing frequency so that the synchronism between character store and counter is automatically ensured. As soon as the end of the line is reached, it is possible for the column $s_M$, i.e., the column of the character store containing the information of the centre of the line, to be indicated from the position of the said counter, namely $$s_M = n/2$$

if $n$ is the position of the counter. The information of this column can be transferred, for example, directly to the column of the character store which is desired for the first line and, subsequently, the whole character store can slowly be filled with the whole character in the original manner. Thus, the centre of the first line is also accurately found without additional storage means being required.

Shift registers are often used for such character stores. In this case the direct transfer of the information from the column $s_M$ to the desired column involves a considerable use of logical gates. Thus several different possibilities are given hereinafter for obtaining the transfer of information with less expenditure. These possibilities are based on utilizing the properties of the character store as a shift register.

Figure 2:
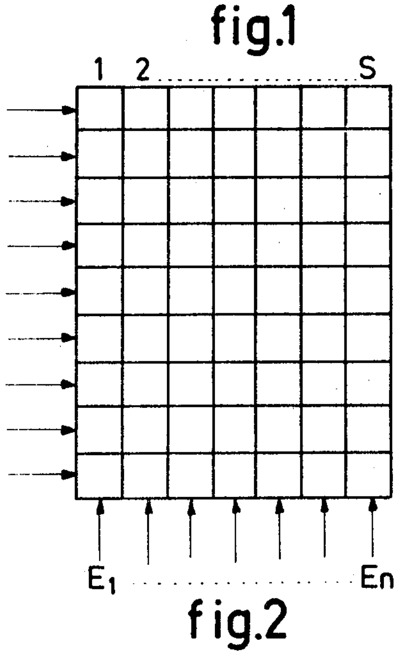
FIG. 2 shows the fundamental structure of the character store.

FIG. 2 shows the fundamental structure of a character store which receives the information from the sensing elements in column 1 in some form or other and in which a signal on the shift input of a given column transfers the information of the preceding column in parallel to this column. In normal operation the shift rhythm inputs are all connected together and a signal on all shift inputs simultaneously thus causes the complete register information to be shifted by one column to the right, the information shifted out of the final column S generally being suppressed. If desired, the shift register may have still further directions of shifting, for example the vertical, but this is unimportant in this connection.

There are several possibilities to fill the register with the sensed character. To explain the inventive idea more fully, one possibility is taken here by way of example. As can be seen from FIG. 1, the character is sensed from right to left and in FIG. 2 shifted from left to right into the register in which the number S of the columns is exactly equal to the number of the interrogation points $T_n$ of a character. Thus the information of the interrogation point $T_1$ after sensing of the whole character must be available in the rightmost column S of the register. When related to the previous constructions this means that the information of the column $s_M$ has to be transferred to the column S. Since a certain time interval exists between the end of the first line of a character and the second interrogation point even with the thickest lines permissible, this transfer may be effected more advantageously by shifting.

Figure 3:
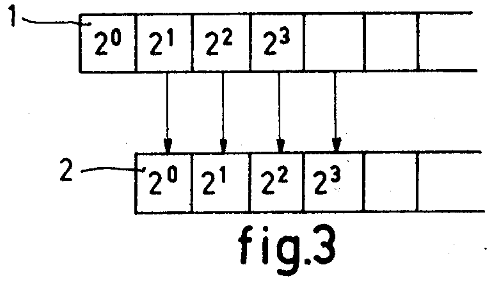
FIG. 3 shows the transfer of the halved content of a binary counter to another.

As soon as the end of the first vertical line is reached, a second counter is set to the position $n/2$ if $n$ is the position just reached of the above-mentioned first counter. If both counters are designed as binary counters with the separate position values 1, 2, 4, 8......, the position of the counter may be halved by merely lowering all values by one stage and omitting the final stage, while the second counter can be set by purely parallel transfer, just as in a shift register, as shown diagrammatically in FIG. 3. Furthermore the second counter upon each counting pulse must provide a shift pulse to the register until it has reached the position S. Then the information of the column $s_M$ has also exactly reached the column S. For the rest of the character now only at each interrogation point $T_2$ to $T_n$ not only the information but also a shift pulse is transferred to the register and this to all columns except the final column S so that the information available in the register before the interrogation point $T_2$ except the information of the column S, is shifted out in the column S-1 until the information of the interrogation point $T_2$ has just reached the column S-1 and the character is thus completely stored.

Figure 4:
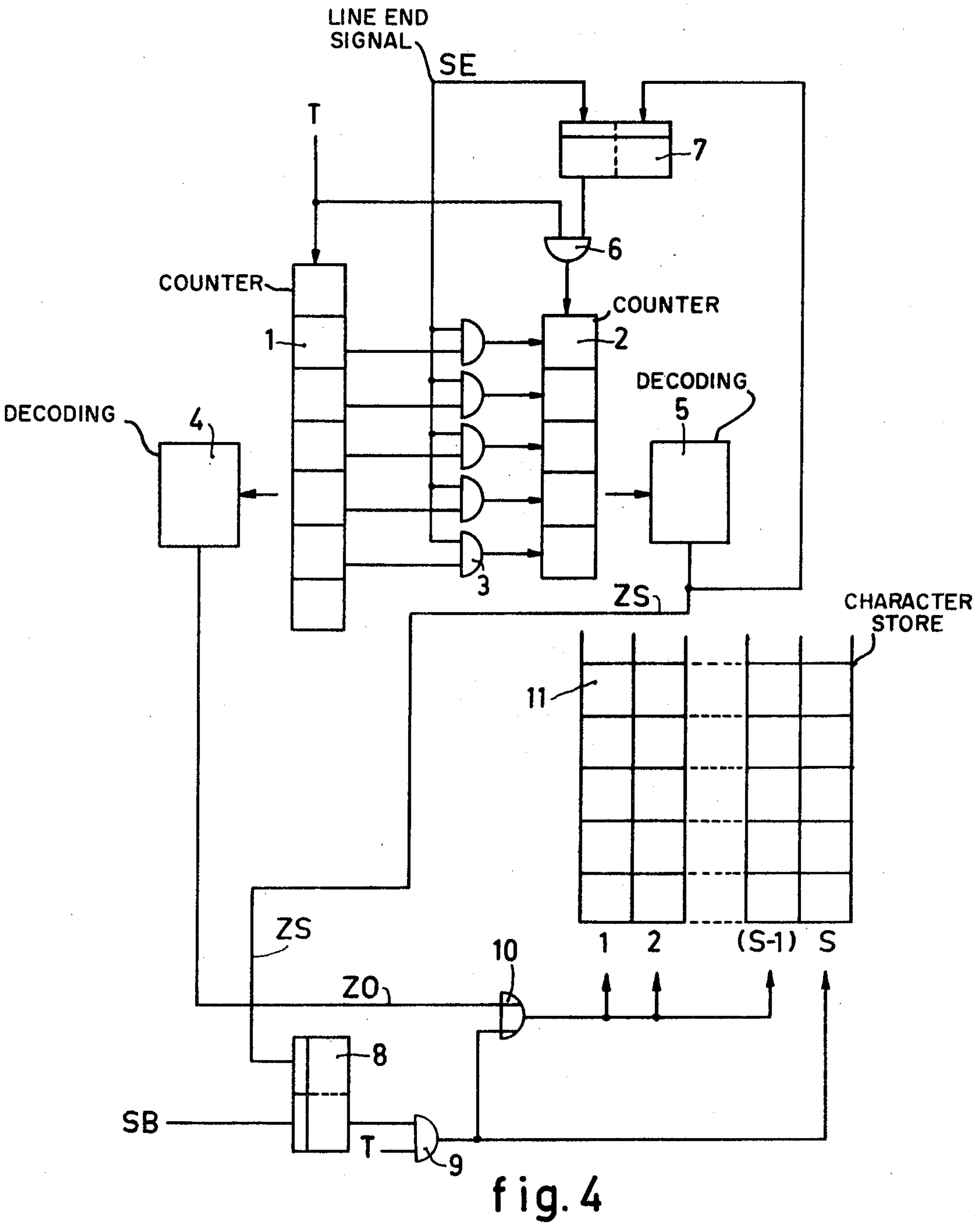
FIG. 4 shows a circuitry example.

The length S of the register is given by the form of the character or by the number of the interrogation points. Inter alia it is also necessary to store in it a whole line width at the beginning of the character. The latter requirement may be weakened in the sense that at least the part of the line which may contain the centre must be stored, i.e., the register must accommodate at least half of the thickest line. However, thus nothing changes in the setting and counting of the second counter, apart from its different length and counting capacity. For explanatory purposes FIG. 4 shows one of the possible embodiments of the idea described. 1 indicates the first counter and 2 the second counter, while 3 are the AND-elements through which the counter 2 can be set by the counter 1 and which AND-elements may, for example, also be built up from RC-elements. As soon as the sensing of the first vertical line begins and the signal SB "line beginning" appears, a bistable trigger stage 8 is set to the operating position and the clock pulse T is applied through a control circuit (not shown) to the counter 1 and AND-elements 6 and 9. The AND-element 6 is still blocked by a bistable flipflop stage 7, whereas through the AND-element 9 the clock pulse T reaches the column S and further through an OR-element 10 reaches the columns 1 to (S-1) of a character store 11. When the sensing of the line is ended and the signal SE "line end" appears, the counter 2 is set by the counter 1 in the described manner at the same time the trigger stage 7 set to the operating position. Thus the AND-element 6 is also released and the counter 2 receives the clock pulse T, while the clock pulse T also is applied to all columns 1 to S of the character store 11, until the counter 2 reaches the position S. Now the decoding circuit 5 provides a signal which sets the trigger stage 8 to the rest position and hence cuts off the AND-element 9, so that for the time being no further pulses reach the character store 11. Only when the counter 1 has completed one revolution and has again reached the "0"-position, which takes place at the interrogation instants $T_2$ to $T_n$, the decoding circuit 4 provides a signal which gives pulses through the OR-element 10 to the columns 1 to (S-1) of the character store 11, whereas the information of the column S remains unchanged.

Figure 5:
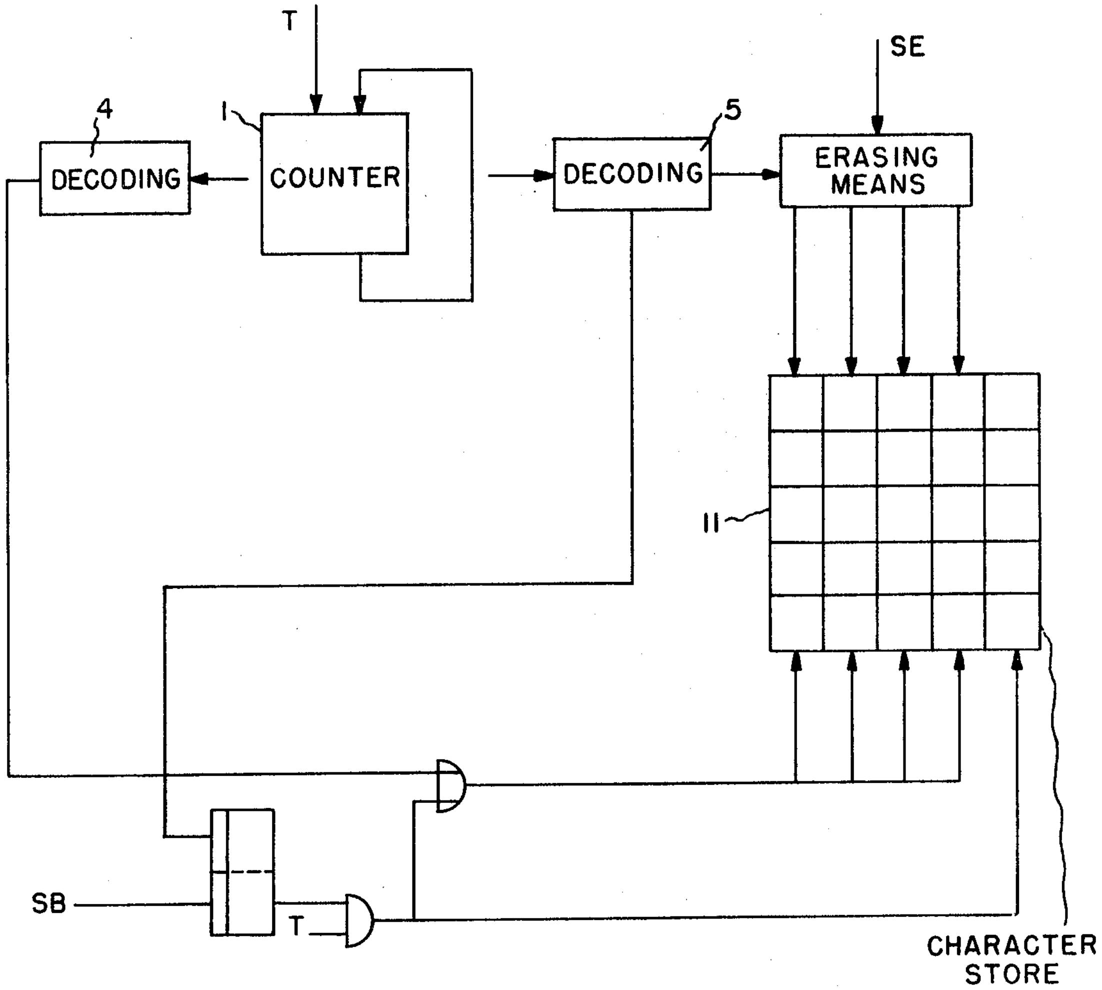
FIG. 5 shows a further embodiment.

The second counter can be avoided if the character store permits of erasing the content separately or in columns. In this case as shown in FIG. 5 the information of the column $s_M$ can be transferred to the column S in that with the signal SE "line end" all columns except the column $s_M$ are erased dependent upon the position of the first counter. To that effect every column receives the erasing signal via a separate AND-element that is blocked by the decoded counter positions, that is, the AND-element of column 1 by the counter positions 1 and 2, the AND-element of column 2 by the counter positions 3 and 4, and so on. Subsequently shift pulses are applied to the character store until in the final column S an information appears which must be the information of the column $s_M$ since all other pieces of information have been erased. The further process is similar to that of the circuit shown in FIG. 4.

A further possibility starts from the following idea: If the character store is operated with shift pulses of constant frequency up to the interrogation point $T_2$ instead of to the end of the first line, it receives at the interrogation point $T_2$ also an accurate picture of the read character, as shown in FIG. 1. Since the distance between the interrogation points $T_1$ and $T_2$ is constant independent of the thickness of the sensed line, the information of the line centre at the instant $T_2$ is always available in a specified column in the character store because the number shifts after H is the complement of half the number of shifts between V and H. This column is the final column in the character store if the number of the columns is equal to half the cycle length of the counter and the store is constantly operated with the lower of the two different counting frequencies. Thus the desired information of the line centre is automatically available in the correct column without additional control.

However, this often results in a number of columns in the character store which is much greater than is necessary for the storage of the whole character. In this case also it may be considered that it suffices to store at least half of the thickest line. On the other hand it is important that the information in the character store is actually shifted by the number of positions corresponding to the capacity of the counter. Since the character store is built up as a shift register, this register may be closed in horizontal direction (in the drawing) to form a ring in which the information path from the scanning element to the register is blocked and the outputs of the final column are switched to the inputs of the first column of the same row, as soon as the information of the beginning of the vertical line has reached the end of the register, so that up to the interrogation point $T_2$ the information of the line may repeatedly have been shifted about in the register. So it need be only an integral multiple of the number of columns that is equal to the capacity of the counter. Furthermore the character store may be shortened if the beginning of the line up to at most the centre of the thinnest line is omitted so that only the possible region of the centre of the line is stored intermediately. This is effected in that the register is closed in the form of a ring only from a certain position of the counter at which the centre of the thinnest line may just have reached the end of the register.

However, an intimate relationship thus still exists between the length of the character store and the capacity of the counter, whereas the character store should actually conform itself only to the form of the character. To obtain more freedom in this respect, the clock pulses to the character store may either already be switched off before the interrogation point $T_2$ or switched to the low frequency so that the actual center of the line at the interrogation point $T_2$ is correspondingly many columns earlier, but in this case also, independent of the line thickness, always in the same column, as long as this premature switching off does not take place before the end of the thickness line. However, since an interval always exists between the end of the thickest line present and the interrogation point $T_2$, for a given character store and a given capacity of the counter, it may always be ensured by a corresponding choice of the position of the counter at which the switching of the clock pulse occurs, that the information of the centre of the line ($T_1$) is available at the end of the character store, up to the interrogation point $T_2$.

In this case in which cyclization is already provided, it may also be more advantageous if the information of the centre of the line at the interrogation point $T_2$ is present in the first column and is transferred by the interrogation pulse at $T_2$ to the second column, whereas the information of the interrogation point $T_2$ is transferred to column 1. This may be achieved in the same manner as before, by a corresponding choice of the position of the counter for the switching of the shift pulses, and would have the result that the special relation of the final column to the shift pulses is not necessary, that is to say all columns receive the same shift pulses.

What is claimed is:

1. A scanned sensing arrangement for use in a character recognition device for sensing printed character of a predetermined style of type, each of said characters consisting primarily of vertical and horizontal line elements, and comprising a character store for storing an entire characters in the form of interrogation digitizations resulting from scanning said character at each of a plurality of primary interrogation positions extending across the entire character, said character store further storing a plurality of intermediate digitizations representing interrogation positions intermediate said primary interrogation positions, sensed at a frequency rate exceeding that of said primary interrogation positions and intermediate adjacent segments of the first scanned single vertical line element, said line element having a predetermined thickness, first means responsive to the sensing of positions corresponding to said intermediate digitizations for accumulating a first signal representative thereof, second means responsive to the final segment of said single vertical line element for deriving a control signal from said first signal, gating means responsive to said control signal and coupled to said character store for converting said plurality of stored intermediate digitizations into a single digitization representative of the centre of said single vertical line element in accordance with said control signal, the remaining storage of said character store storing the remaining digitizations corresponding to said interrogation positions.

2. An arrangement as claimed in claim 1, wherein said character store is a multicolumn shift register, and said first and second means are each counters, said second counter responsive to a signal condition sensed at said final segment of the first vertical line of a character for changing to the position $n/2$ where $n$ is the position of the first counter at said signal condition, and wherein a shift pulse is coupled through said gating means with each counting pulse from the second counter, until the second counter has reached the S-position if S is the total number of columns in said shift register, and further gating means coupled to said gating means and said character store to provide a shift pulse in all columns except the final in response to the output of said first counter.

3. An arrangement as claimed in claim 1, wherein said first means is a counter capable of cyclic operation, and said character store is multi-column shift register the content of which can be erased, means for erasing all of the content of said shift register in response to sensing said final segment of the first vertical line of a character but for the column $s$, where $s=n/2$ and $n$ is the position of the first counter at this instant, said gating means supplying to said character store shift pulses until an information is available in the final column thereof and means applying a shift pulse in all columns except the final only at the beginning of the cycle of said first counter.

* * * * *